United States Patent
Goodchild et al.

(10) Patent No.: US 10,958,110 B2
(45) Date of Patent: Mar. 23, 2021

(54) PARALLEL VOLTAGE AND CURRENT MULTIPLE AMPLITUDE SHIFT KEY DEMODULATION

(71) Applicant: AIRA, Inc., Chandler, AZ (US)

(72) Inventors: Eric Heindel Goodchild, San Tan Valley, AZ (US); John Winters, San Diego, CA (US)

(73) Assignee: AIRA, INC., Chandler, AZ (US)

( * ) Notice: Subject to any disclaimer, the term of this patent is extended or adjusted under 35 U.S.C. 154(b) by 0 days.

(21) Appl. No.: 16/885,247

(22) Filed: May 27, 2020

(65) Prior Publication Data

US 2020/0381959 A1    Dec. 3, 2020

Related U.S. Application Data

(60) Provisional application No. 62/853,708, filed on May 28, 2019, provisional application No. 62/856,933, filed on Jun. 4, 2019, provisional application No. 62/901,256, filed on Sep. 16, 2019.

(51) Int. Cl.
| | |
|---|---|
| *H03D 3/00* | (2006.01) |
| *H02J 50/80* | (2016.01) |
| *H04L 27/06* | (2006.01) |
| *H04B 5/00* | (2006.01) |
| *H02J 7/00* | (2006.01) |
| *H02J 50/10* | (2016.01) |

(52) U.S. Cl.
CPC .......... *H02J 50/80* (2016.02); *H02J 7/00034* (2020.01); *H02J 50/10* (2016.02); *H04B 5/0037* (2013.01); *H04B 5/0075* (2013.01); *H04L 27/06* (2013.01)

(58) Field of Classification Search
CPC ........ H02J 50/80; H02J 50/10; H02J 7/00034; H04B 5/0037; H04B 5/0075; H04L 27/06
USPC ....................................................... 375/320
See application file for complete search history.

(56) References Cited

U.S. PATENT DOCUMENTS

| | | |
|---|---|---|
| 8,970,168 B2 | 3/2015 | Kohlschmidt et al. |
| 8,994,325 B2 | 3/2015 | Carbunaru et al. |
| 9,407,332 B2 | 8/2016 | Norconk et al. |
| 2008/0272932 A1 | 11/2008 | Booker et al. |

(Continued)

FOREIGN PATENT DOCUMENTS

WO    2006001557 A1    1/2006

OTHER PUBLICATIONS

International Search Report and Written Opinion for International Application No. PCT/US20/34990, dated Aug. 26, 2020, 8 pages.

*Primary Examiner* — Don N Vo
(74) *Attorney, Agent, or Firm* — Loza & Loza, LLP; Anthony G. Smyth (57) ABSTRACT

Systems, methods and apparatus for wireless charging are disclosed. A method for decoding data includes demodulating voltage or current waveform in each tank circuit of a plurality of inductive power transfer circuits to obtain at least one demodulated signal from each tank circuit, capturing a bit sequence from each demodulated signal by clocking signal state of each demodulated signal through a direct memory access (DMA) circuit, streaming bit sequences received from the DMA circuit into a plurality of data streams, and decoding one or more messages from the plurality of data streams.

20 Claims, 8 Drawing Sheets

(56) References Cited

U.S. PATENT DOCUMENTS

| | | | |
|---|---|---|---|
| 2013/0193773 A1* | 8/2013 | Van Wageningen | ..................... H04B 5/0037 307/104 |
| 2013/0260676 A1* | 10/2013 | Singh | ............... H04B 5/0068 455/41.1 |
| 2016/0099578 A1* | 4/2016 | Hwang | ................... H02J 50/12 307/104 |
| 2016/0336785 A1 | 11/2016 | Gao et al. | |
| 2019/0020210 A1* | 1/2019 | Partovi | ................. B60L 53/126 |
| 2019/0371515 A1* | 12/2019 | Ha | ........................ H02J 50/40 |
| 2020/0076245 A1* | 3/2020 | Jin | .......................... H02J 7/02 |

\* cited by examiner

PARALLEL VOLTAGE AND CURRENT MULTIPLE AMPLITUDE SHIFT KEY DEMODULATION

PRIORITY CLAIM

This application claims priority to and the benefit of provisional patent application No. 62/853,708 filed in the United States Patent Office on May 28, 2019, of provisional patent application No. 62/856,933 filed in the United States Patent Office on Jun. 4, 2019, and of provisional patent application No. 62/901,256 filed in the United States Patent Office on Sep. 16, 2019, the entire content of which applications are incorporated herein by reference as if fully set forth below in their entirety and for all applicable purposes.

TECHNICAL FIELD

The present invention relates generally to wireless charging of batteries, including batteries in mobile computing devices and more particularly to communications between a charging device and a device being charged.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Conventional wireless charging systems typically use a "Ping" to determine if a receiving device is present on or proximate to a transmitting coil in a base station for wireless charging. The transmitter coil has an inductance (L) and, a resonant capacitor that has a capacitance (C) is coupled to the transmitting coil to obtain a resonant LC circuit. A Ping is produced by delivering power to the resonant LC circuit. Power is applied for a duration of time (90 ms in one example) while the transmitter listens for a response from a receiving device. The response may be provided in a signal encoded using Amplitude Shift Key (ASK) modulation. This conventional Ping-based approach can be slow due to the 90 ms duration, and can dissipate large and significant amount of energy, which may amount to 80 mJ per Ping. In one example, a typical transmitting base station may ping as fast as 12.5 times a second (period=1/80 ms) with a power consumption of (80 mJ*12.5) per second=1 W. In practice most, designs trade off responsiveness for a lower quiescent power draw by lowering the ping rate. As an example, a transmitter may ping 5 times a second with a resultant power draw of 400 mW.

Improvements in wireless charging capabilities are required to support continually increasing complexity of mobile devices. For example, there is a need for improved communication between charging devices and device being charged.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to systems, apparatus and methods applicable to wireless charging devices and techniques. Charging cells may be configured with one or more inductive coils to provide a charging surface that can charge one or more devices wirelessly. The location of a device to be charged may be detected through sensing techniques that associate location of a device to changes in a physical characteristic centered at a known location on the charging surface. Sensing of location may be implemented using capacitive, resistive, inductive, touch, pressure, load, strain, and/or another appropriate type of sensing.

One aspect of the present disclosure relates to systems, apparatus and methods that enable fast, low-power detection of objects placed in proximity to a charging surface. In one example, an object may be detected when a pulse provided to a charging circuit stimulates an oscillation in the charging circuit, or in some portion thereof. A frequency of oscillation of the charging circuit responsive to the pulse or a rate of decay of the oscillation of the charging circuit may be indicative or determinative of presence of a chargeable device has been placed in proximity to a coil of the charging circuit. Identification of a type or nature of the object may be made based on changes in a characteristic of the charging circuit. The pulse provided to the charging circuit may have a duration that is less than half the period of a nominal resonant frequency of the charging circuit.

In one aspect of the disclosure, an apparatus for detecting objects near a charging surface has a resonant circuit that includes a charging coil attached to the charging surface, a circuit configured to provide a measurement signal representative of the quality factor of the resonant circuit based on a measured response of the resonant circuit to a passive ping, a filter configured to provide a filtered version of the measurement signal that changes at a slower rate than the measurement signal, and comparison logic configured to generate a detection signal that switches when a difference between the measurement signal and the filtered version of the measurement signal exceeds a threshold level. The detection signal may indicate whether an object is positioned proximate to the charging coil.

Charging Cells

According to certain aspects disclosed herein, a charging surface may be provided using charging cells that are deployed adjacent to the charging surface. In one example the charging cells are deployed in accordance with a honeycomb packaging configuration. A charging cell may be implemented using one or more coils that can each induce a magnetic field along an axis that is substantially orthogonal to the charging surface adjacent to the coil. In this description, a charging cell may refer to an element having one or more coils where each coil is configured to produce an electromagnetic field that is additive with respect to the fields produced by other coils in the charging cell, and directed along or proximate to a common axis.

In some implementations, a charging cell includes coils that are stacked along a common axis and/or that overlap such that they contribute to an induced magnetic field substantially orthogonal to the charging surface. In some implementations, a charging cell includes coils that are arranged within a defined portion of the charging surface and that contribute to an induced magnetic field within the substantially orthogonal to portion of the charging surface associated with the charging cell. In some implementations, charging cells may be configurable by providing an activating current to coils that are included in a dynamically-defined charging cell. For example, a charging device may include multiple stacks of coils deployed across a charging surface, and the charging device may detect the location of a device to be charged and may select some combination of stacks of coils to provide a charging cell adjacent to the device to be charged. In some instances, a charging cell may include, or be characterized as a single coil. However, it should be appreciated that a charging cell may include multiple stacked coils and/or multiple adjacent coils or stacks of coils.

Figure 1:
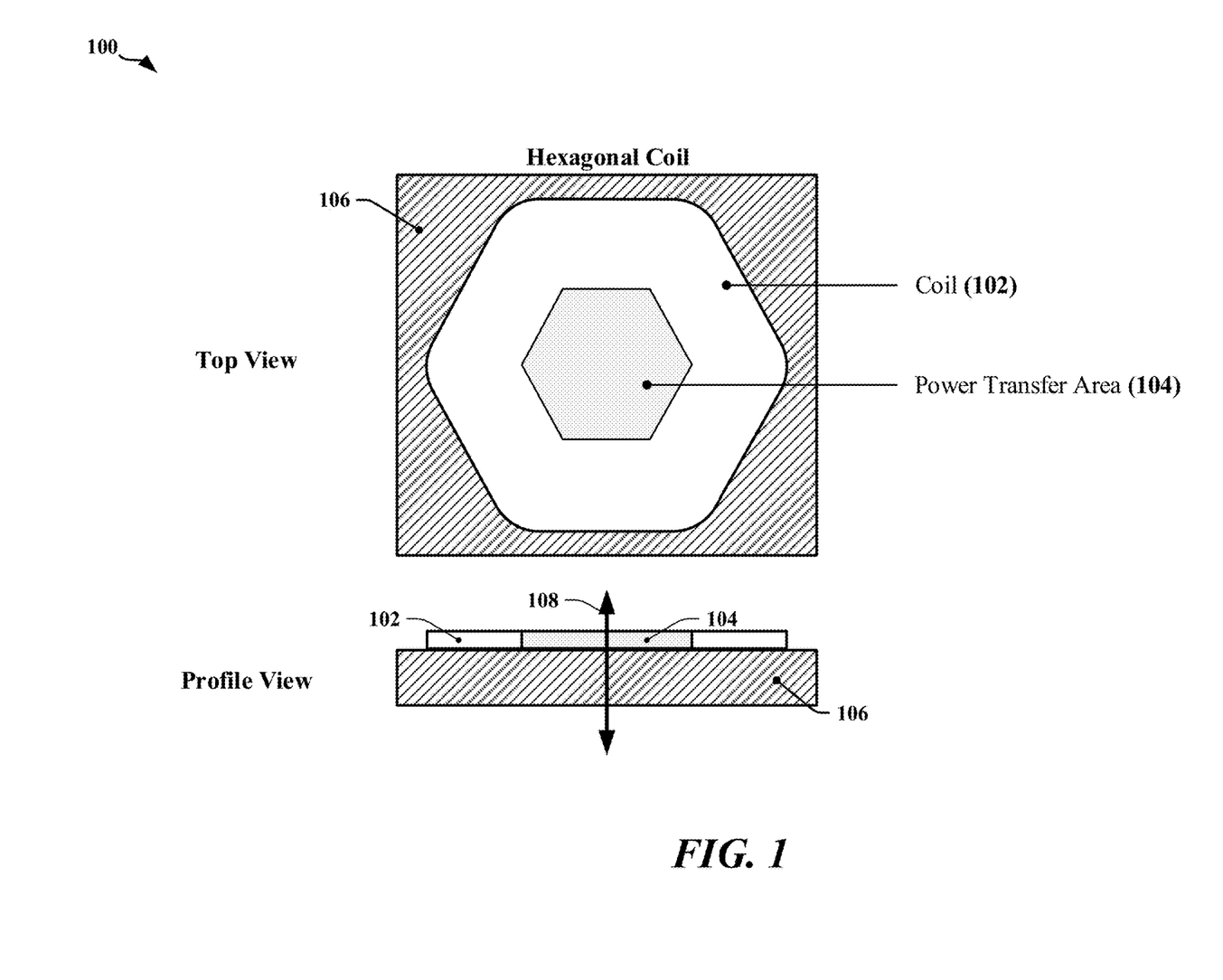
FIG. 1 illustrates an example of a charging cell that may be employed to provide a charging surface in accordance with certain aspects disclosed herein.

FIG. 1 illustrates an example of a charging cell 100 that may be deployed and/or configured to provide a charging surface. In this example, the charging cell 100 has a substantially hexagonal shape that encloses one or more coils 102 constructed using conductors, wires or circuit board traces that can receive a current sufficient to produce an electromagnetic field in a power transfer area 104. In various implementations, some coils 102 may have a shape that is substantially polygonal, including the hexagonal charging cell 100 illustrated in FIG. 1. Other implementations may provide coils 102 that have other shapes. The shape of the coils 102 may be determined at least in part by the capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
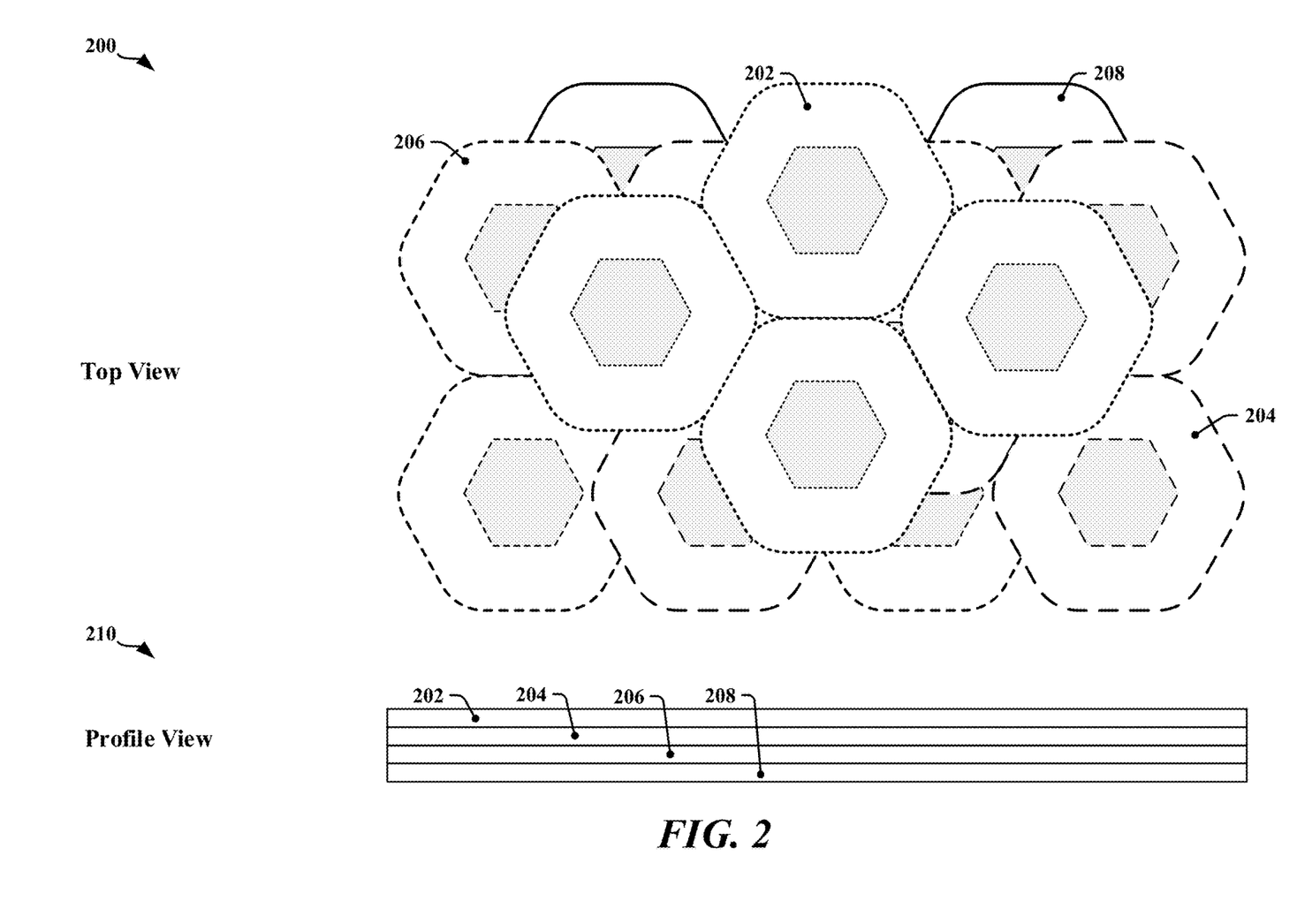
FIG. 2 illustrates an example of an arrangement of charging cells when multiple layers are overlaid within a segment of a charging surface that may be adapted in accordance with certain aspects disclosed herein.

FIG. 2 illustrates an example of an arrangement of charging cells from two perspectives 200, 210 when multiple layers are overlaid within a segment of a charging surface that may be adapted in accordance with certain aspects disclosed herein. Layers of charging cells 202, 204, 206, 208 provided within a segment of a charging surface. The charging cells within each layer of charging cells 202, 204, 206, 208 are arranged according to a honeycomb packaging configuration. In one example, the layers of charging cells 202, 204, 206, 208 may be formed on a printed circuit board that has four or more layers. The arrangement of charging cells 100 can be selected to provide complete coverage of a designated charging area that is adjacent to the illustrated segment.

Figure 3:
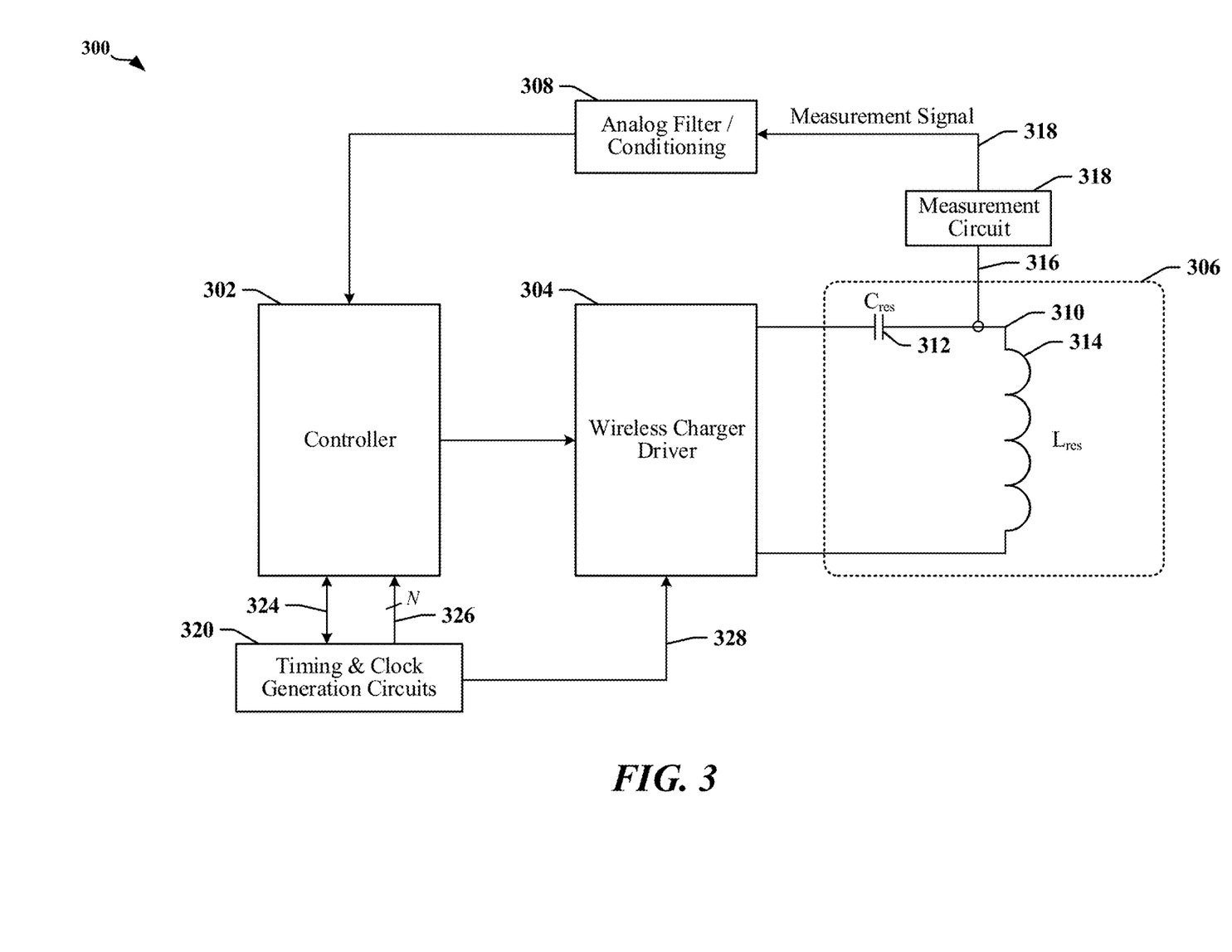
FIG. 3 illustrates a wireless transmitter that may be provided in a charger base station in accordance with certain aspects disclosed herein.

FIG. 3 illustrates a wireless transmitter 300 that may be provided in a charger base station. A controller 302 may receive a feedback signal filtered or otherwise processed by a filter circuit 308. The controller may control the operation of a driver circuit 304. The driver circuit 304 provides an alternating current to a resonant circuit 306 that includes a capacitor 312 and inductor 314. The frequency of the alternating current may be determined by a charging clock signal 328 provided by timing circuits 320. A measurement circuit may obtain a measurement signal 318 indicative of current flow or voltage 316 measured at an LC node 310 of the resonant circuit 306. The measurement signal 318 may be used to calculate or estimate Q factor of the resonant circuit 306.

The timing circuits 320 may provide the controller with one or more clock signals 324, including a system clock signal that controls the operation of the controller 302. The one or more clock signals 324 may further include a clock signal used to modulate or demodulate a data signal carried on a charging current in the resonant circuit 306. The timing circuits 320 may include configurable clock generators that produce signals at frequencies defined by configuration information, including the charging clock signal 328. The timing circuits 320 may be coupled to the controller through an interface 326. The controller 302 may configure the frequency of the charging clock signal 328. In some implementations, the controller 302 may configure the duration and frequency of a pulsed signal used for passive ping in accordance with certain aspects disclosed herein. In one example, the pulsed signal includes a number of cycles of the pulsed signal.

ASK Modulation

Certain aspects of the disclosure relate to wireless communication of configuration, control, status and other information between a power transmitter and a power receiver that is being wirelessly charged through the power transmitter. The Qi standard defines protocols (the QI protocols) that are commonly-employed protocol used by wireless chargers and include protocols for wireless communication between a power transmitter and a power receiver using. The Qi protocols can enable the power receiver to control the power transmitter wirelessly. The exchange of messages from power receiver to power transmitter is typically effected by way of Amplitude Shift Keying (ASK) modulation that produces an ASK signal carried in the electromagnetic flux between the power transmitter and power receiver. A digital signal processor (DSP) may be employed to decode the ASK signal from the voltage or current in the tank circuit of the inductive power transfer device. In many conventional systems, interrupts are used to measure timing between level changes on the ASK signal. Such methods are applicable to single channel operation and lack the ability to coordinate and validate information received in an ASK encoded signal. In one example, an external demodulation circuit may cooperate with a timer provided by a microcontroller (MCU) to generate interrupts used to calculate time between edges, which can be used to decode the ASK-modulated signal. In another example, a DSP or digital signal controller may be used to demodulate the ASK-modulated signal using digital signal processing methods. In these and other examples, expensive resources are consumed to obtain a minimalist decoding system.

In accordance with certain aspects disclosed herein, an inductive power transmission system (IPTS) enables multiple asynchronous amplitude modulated messages to be multiplexed. The asynchronous amplitude modulated messages may be received from one or more inductively powered devices (IPDs). The amplitude modulated messages may be transparently multiplexed without regard to timing. Reception and resolution of the timing of pulses that are encoded with multiple message streams can be accomplished by sampling multiple signals periodically and measuring each channels pulse sizes to decode all the channels. Two independent but coincident demodulations of the analog ASK signal operating in a band from 210,000 Hz-100,000 Hz, with a base-band of 4000 Hertz can be provided by external demodulation circuits that enable decoding based on signals extracted from both voltage and current amplitudes. The two decoded signals can be used to provide a reliable communication system.

A demodulation scheme provided in accordance with certain aspects of this disclosure can enable a designer to use a single 8-bit parallel port to capture and decode encoded information transmitted through four different charging pads, where each charging pad provides current-derived and voltage-derived versions of an ASK signal. Communication with up to four different IPDs can be handled through the parallel port, and the recurring time and processing costs of conventional methods of wireless inductive communication associated with the decoding of dedicated signals from multiple inductive charging pads may be significantly reduced.

Figure 4:
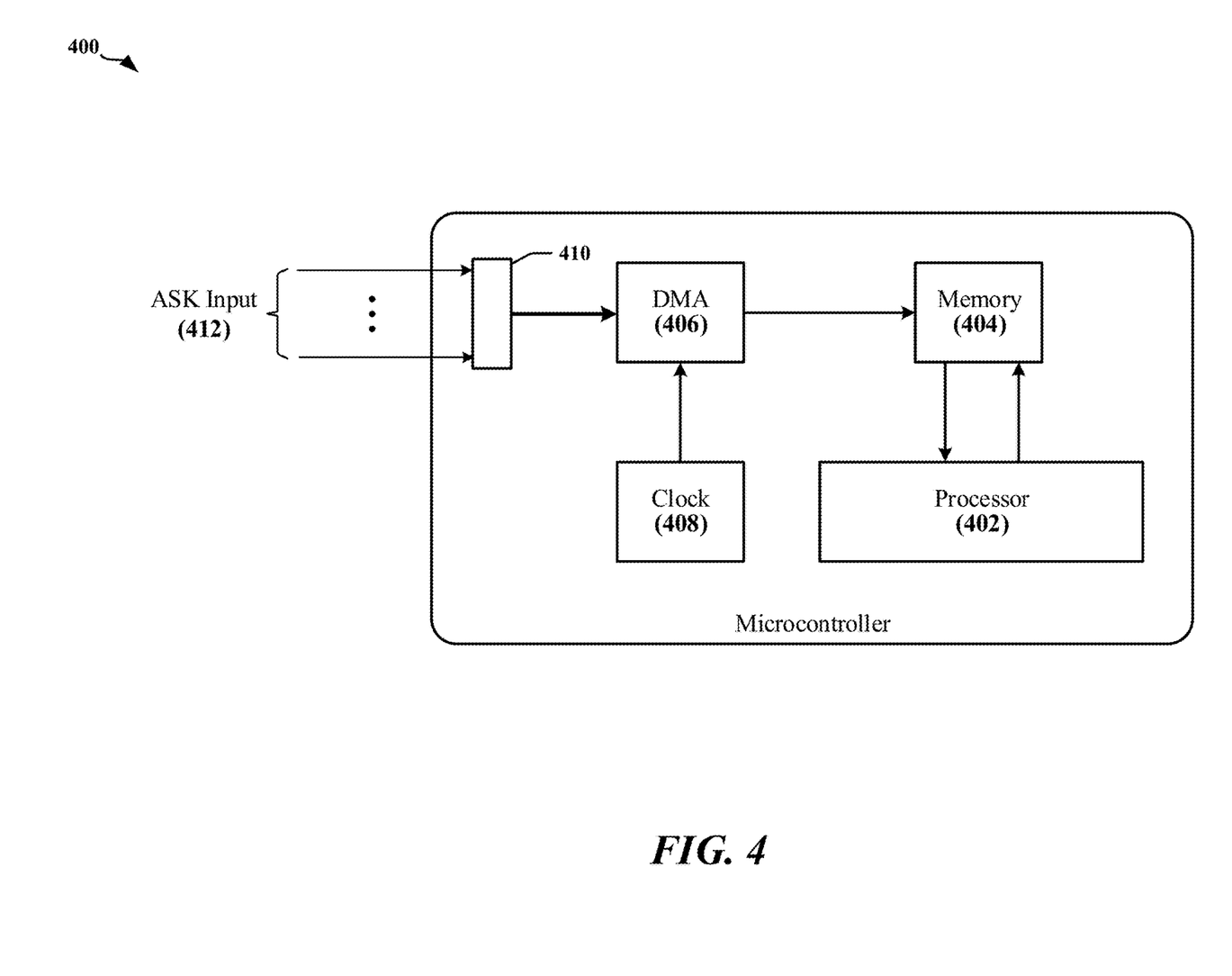
FIG. 4 illustrates a microcontroller that supports parallel voltage and current multiple ASK demodulation in accordance with certain aspects disclosed herein.

FIG. 4 illustrates an MCU 400 that may be configured to implement a demodulation scheme provided in accordance with certain aspects of this disclosure. In the illustrated example, a parallel port 410 of an MCU 400 receives ASK input 412, which may be obtained from multiple charging pads. A clock generator circuit 408 provides a clock signal used to clock a direct memory access (DMA) controller 406. In one example, the DMA controller 406 is clocked by a clock signal at 24,000 Hertz in order to sample the signals concurrently. Samples are moved to a buffer 404 of size 24 bytes every millisecond. Each bit of the byte inducted is used for a different channel. Pairs of bits in the byte may represent decoded corresponding bits decoded from current and voltage state.

In one example, a processor 402 processes the buffer 404 for all eight channels at least once every millisecond. The processor 402 may provide the messages contained therein to be processed by a master control module. Information decoded from ASK signals carried in the current and voltage channels may be combined to obtain a reliably decoded message even where only one of the channels has correctly decoded the message.

The MCU 400 may operate without the use of dedicated timers and/or any interrupts in the processor 402, thereby avoiding inefficiencies that can arise from context-switching and task-switching. The timing of the ASK signals and their encoded messages can be quickly recovered by sampling signal state between edges, without resort to edge-driven methods that can burden or waste processor resources. Eliminating the need for interrupts can increase the reliability of the system when multiple sources of interrupts may require servicing that can cause disruption and unexpected effects on processing. The multiple sources of interrupts, and functions or processes that employ, rely on, or are supported by interrupts may be implemented using certain combinational logic in the same IC device that carries the MCU 400.

An example used in this disclosure relates to decoding of ASK signals from four devices that are being concurrently charged. In other examples, inputs from more than four concurrently-charging devices may be received and decoded in manner that provides reliable communication and control in addition to efficiency at a cost point below conventional systems. In one example, eight charging pads may be connected to the parallel port 410. In another example, only one of the current and voltage, or a combination of the current and voltage in the tank circuit may be used to derive the demodulated ASK signal. In some instances, information decoded from ASK signals carried in ASK-modulated current and voltage waveforms can be combined using a combination of logic and gates to produce a demodulated ASK signal that may be passed to the parallel port 410 as one ASK signal allowing for a total of eight charge pads to be connected to the parallel port.

Figure 5:
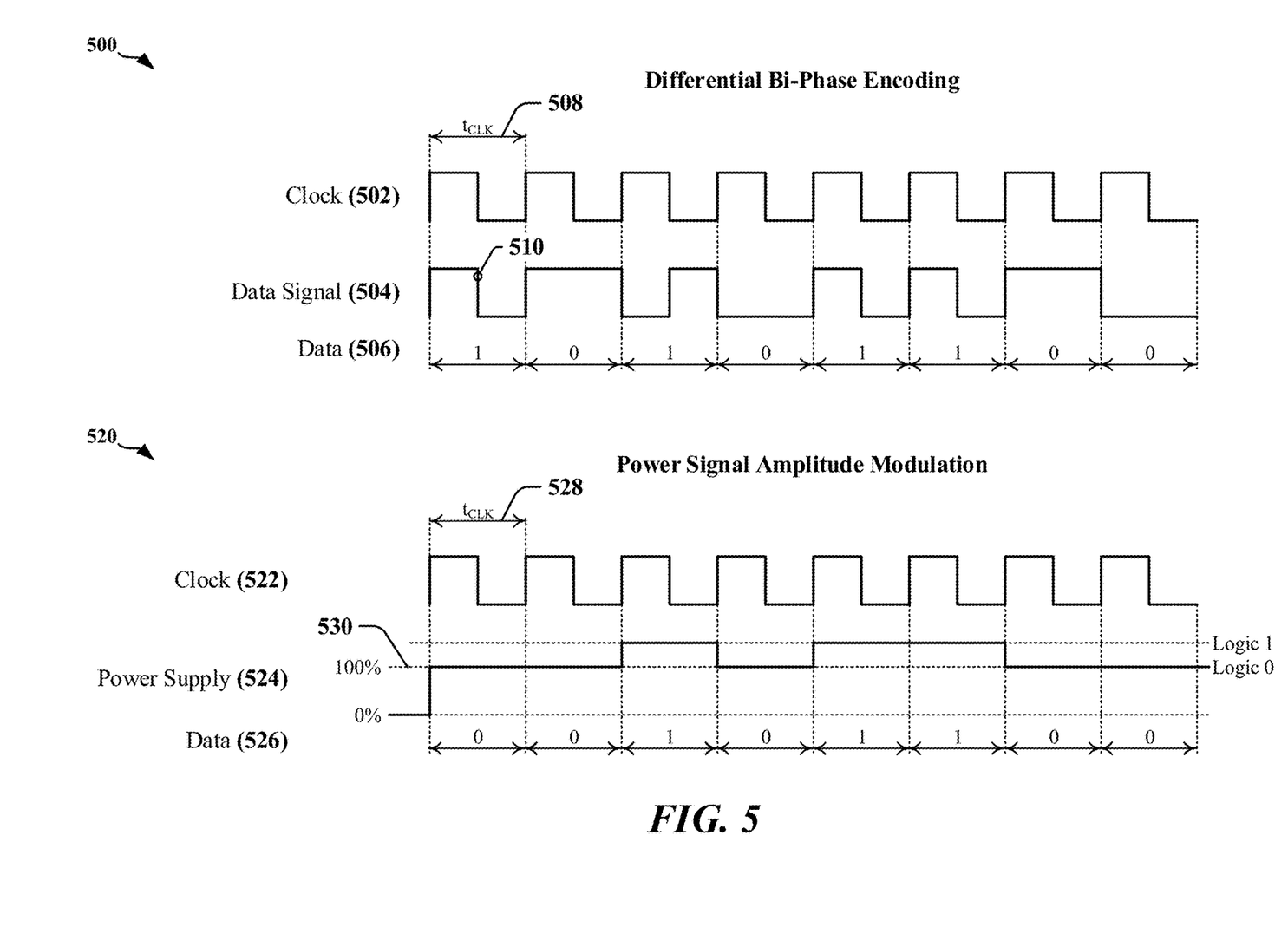
FIG. 5 illustrates examples of encoding schemes that may be adapted to digitally encode messages exchanged between power receivers and power transmitters in accordance with certain aspects disclosed herein.

FIG. 5 illustrates examples of encoding schemes 500, 520 that may be adapted to digitally encode messages exchanged between power receivers and power transmitters. In the first example, a differential bi-phase encoding scheme 500 encodes binary bits in the phase of a data signal 504. In the illustrated example, each bit of a data byte 506 is encoded in a corresponding cycle 508 of an encoder clock signal 502. The value of each bit is encoded in the presence or absence of a transition 510 (phase change) in the data signal 504 during the corresponding cycle 508.

In the second example, a power supply 524 is encoded using a power signal amplitude encoding scheme 520. In the illustrated example, binary bits of a data byte 526 are encoded in level of the power supply 524. Each bit of the data byte 526 is encoded in a corresponding cycle 528 of an encoder clock signal 522. The value of each bit is encoded in the voltage level of the power supply 524 relative to a nominal 100% voltage level 530 of the power supply 524 during the corresponding cycle 508.

Figure 6:
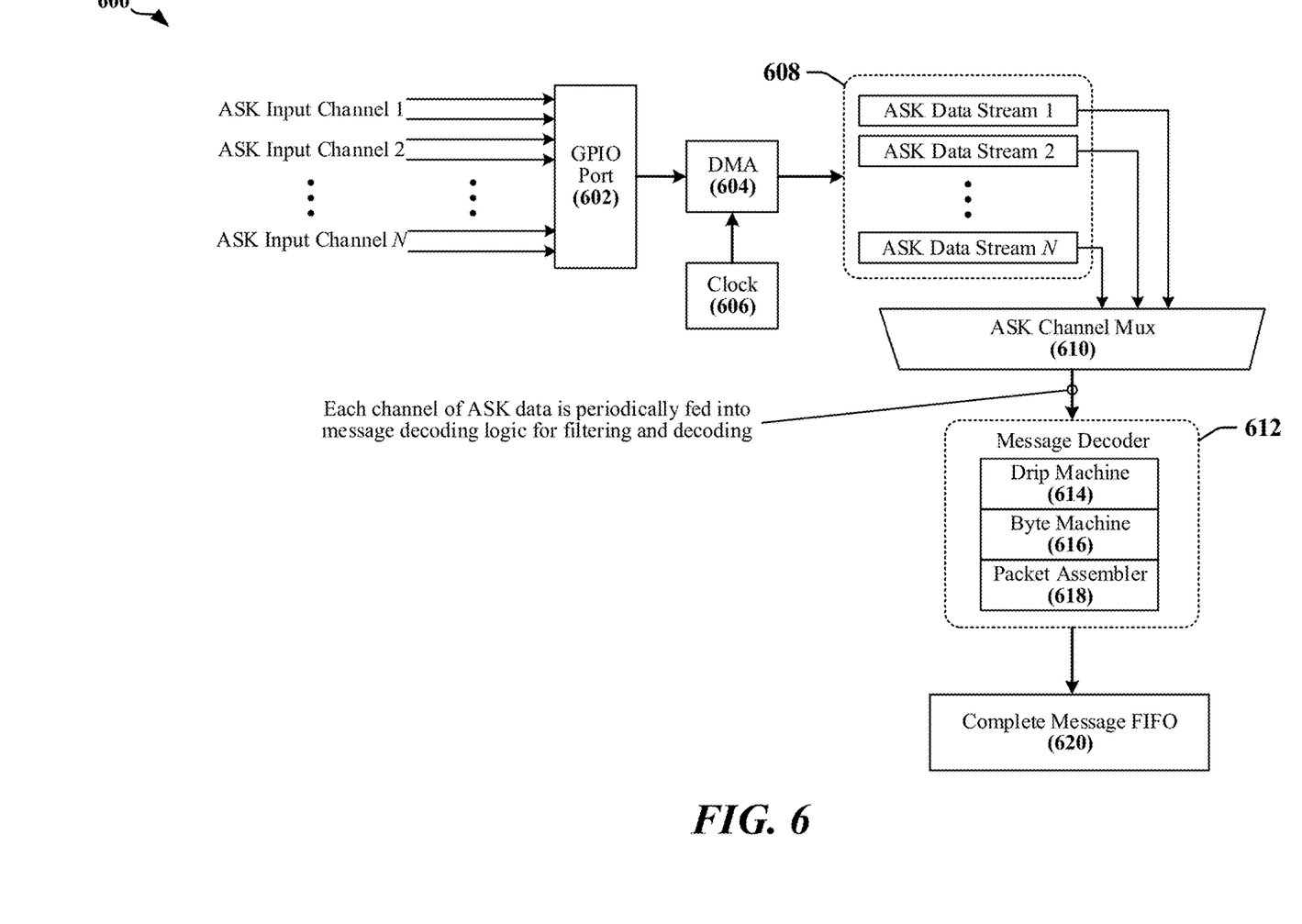
FIG. 6 illustrates decoding of messages exchanged between power receivers and power transmitters in accordance with certain aspects disclosed herein.

FIG. 6 illustrates a data flow 600 illustrating the decoding of messages that may be exchanged between power receivers and power transmitters in accordance with certain aspects of this disclosure. The messages may be transmitted through multiple coils of a charging surface. A general-purpose input/output (GPIO) port 602 may receive N channels of ASK-encoded input. The GPIO port 602 may include analog and digital circuits that are configured to condition and decode the ASK-encoded input. ASK data decoded by the GPIO port 602 may be read using a DMA 604 controller in accordance with timing provided by a clock circuit 606. The ASK data may be organized in multiple ASK data streams 608 that are accessible to a message decoder 612. The message decoder 612 may process individual ASK data stream using a channel multiplexer 610 to handle a current ASK data stream for processing. The message decoder may include bit or nibble processors 614, a byte generation circuit 616 and a packet assembler 618 that produces a message that is buffered using first-in, first-out registers 620.

Figure 7:
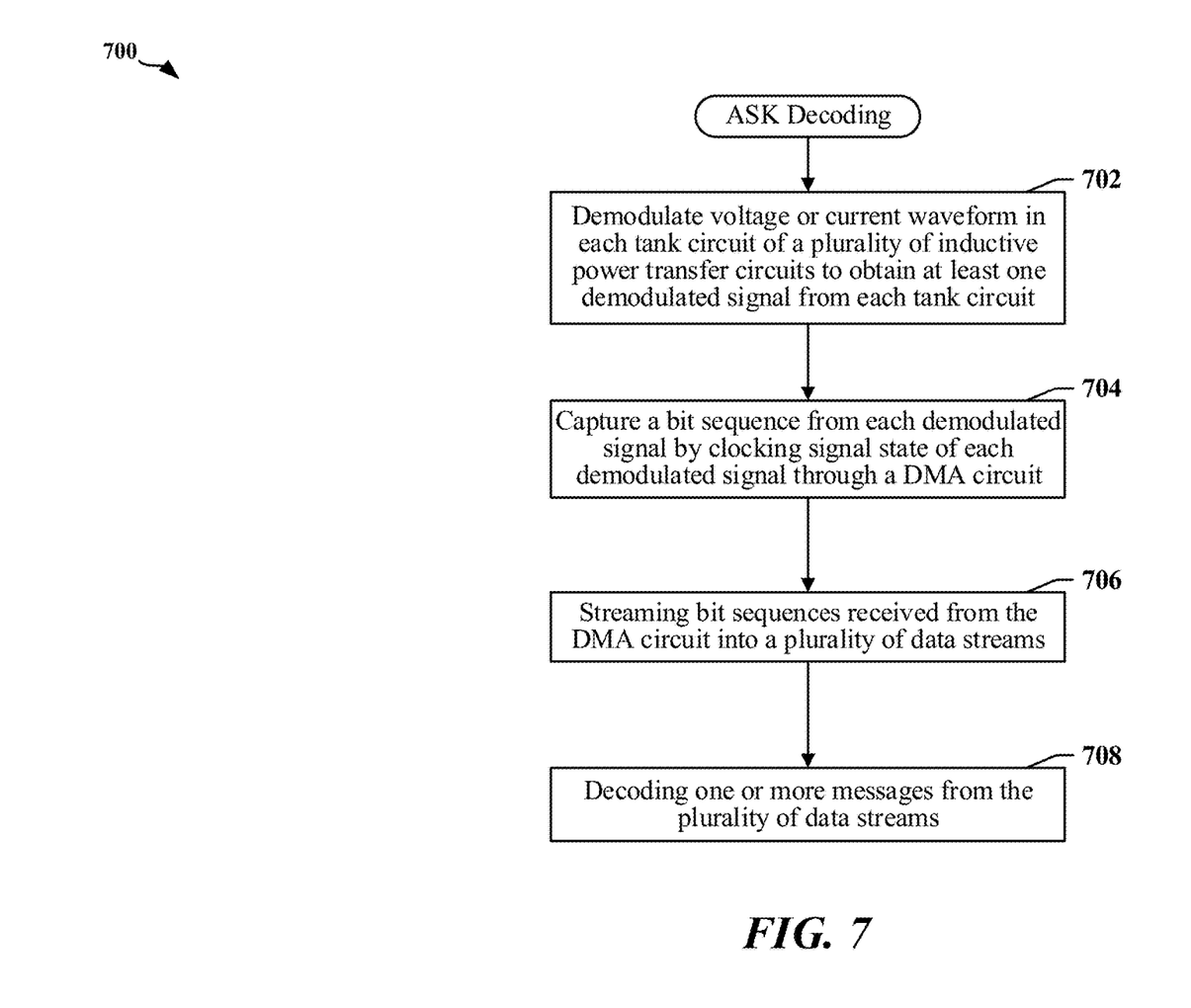
FIG. 7 is flowchart illustrating an example of a method for decoding messages from an ASK-encoded data signal in accordance with certain aspects disclosed herein.

FIG. 7 is flowchart 700 illustrating one example of a method for decoding messages from an ASK-encoded data signal received during a wireless charging event. The method may be performed by a processor or controller in a charging device. At block 702, the processor or controller may demodulate or cause demodulation of a voltage or current waveform in each tank circuit of a plurality of inductive power transfer circuits to obtain at least one demodulated signal from each tank circuit. At block 704, the processor or controller may capture a bit sequence from each demodulated signal by clocking signal state of each demodulated signal through a DMA circuit. At block 706, the processor or controller may stream bit sequences received from the DMA circuit into a plurality of data streams. At block 708, the processor or controller may decode one or more messages from the plurality of data streams. A tank circuit in each inductive power transfer circuit may include a charging coil and a capacitor.

In one example, the processor or controller may demodulate or cause demodulation of a voltage waveform in a first tank circuit to obtain a first demodulated signal. In another example, the processor or controller may demodulate or cause demodulation of a current waveform in the first tank circuit to obtain a first demodulated signal. The processor or controller may capture a first bitstream that includes bits representing the first demodulated signal by clocking signal state of the first demodulated signal through the DMA circuit, capture a second bitstream that includes bits representing the second demodulated signal by clocking signal state of the second demodulated signal through the DMA circuit, decode the first bitstream and the second bitstream independently to obtain two versions of a first encoded message, and select between the two versions of a first encoded message to provide one of the one or more messages decoded from the plurality of data streams. In one example, the processor or controller may capture a combined bitstream by clocking bits representing the combined signal state of first demodulated signal and the second demodulated signal through the DMA circuit, decode the combined bitstream to provide one of the one or more messages decoded from the plurality of data streams.

In certain implementations, capturing the bit sequence from each demodulated signal includes receiving a first demodulated signal at a first input of a GPIO port, and receiving a second demodulated signal at a second input of the GPIO port. The first demodulated signal may be obtained from a first inductive power transfer circuit. The second demodulated signal may be obtained from a second inductive power transfer circuit. The first demodulated signal may be obtained from a voltage waveform in a tank circuit of a first inductive power transfer circuit. The second demodulated signal may be obtained from a current waveform in the tank circuit of the first inductive power transfer circuit.

Example of a Processing Circuit

Figure 8:
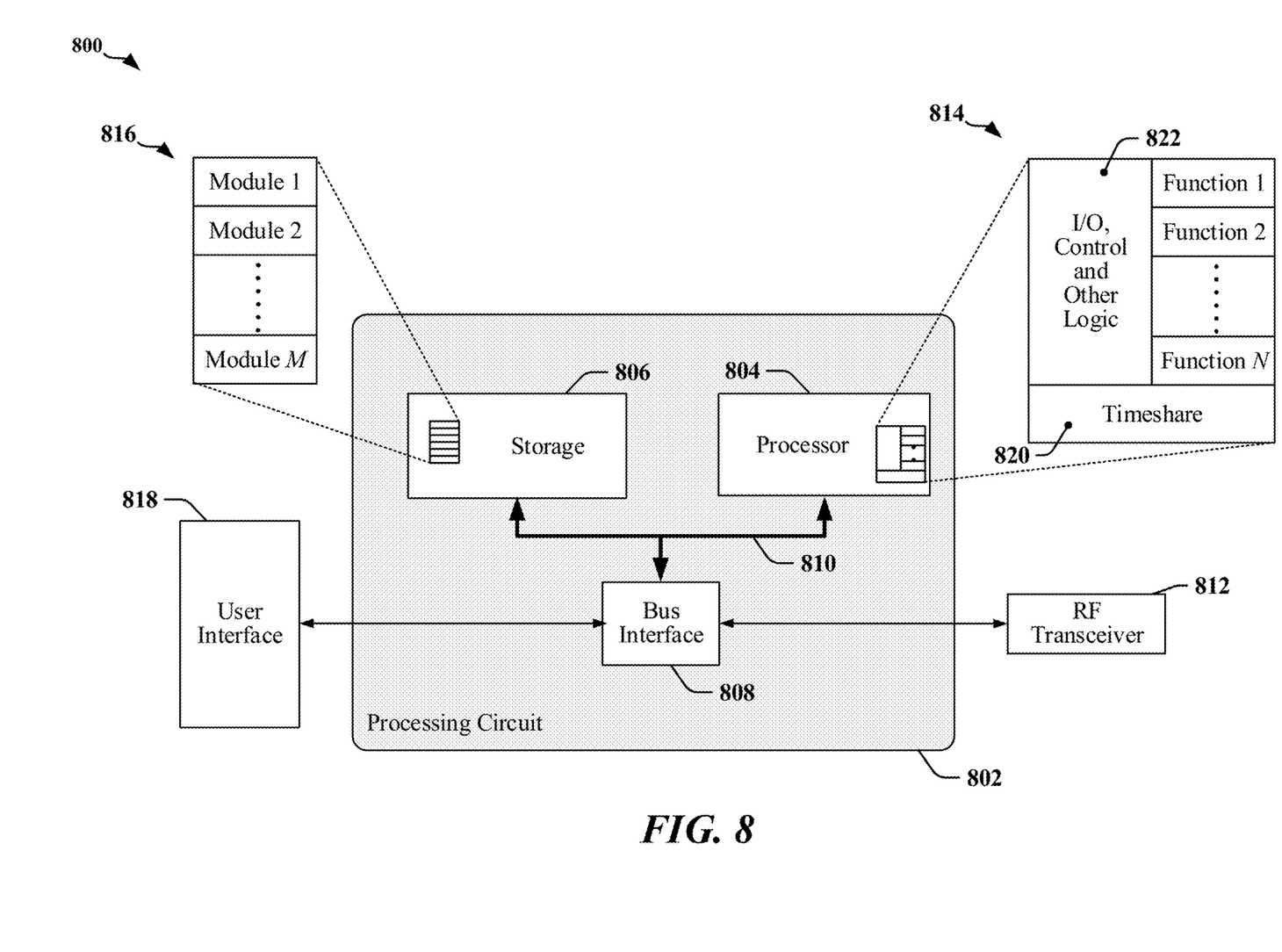
FIG. 8 illustrates one example of an apparatus employing a processing circuit that may be adapted according to certain aspects disclosed herein.

FIG. 8 is a diagram illustrating an example of a hardware implementation for an apparatus 800 that may be incorporated in a charging device or in a receiving device that enables a battery to be wirelessly charged. In some examples, the apparatus 800 may perform one or more functions disclosed herein. In accordance with various aspects of the disclosure, an element, or any portion of an element, or any combination of elements as disclosed herein may be implemented using a processing circuit 802. The processing circuit 802 may include one or more processors 804 that are controlled by some combination of hardware and software modules. Examples of processors 804 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 804 may include specialized processors that perform specific functions, and that may be configured, augmented or controlled by one of the software modules 816. The one or more processors 804 may be configured through a combination of software modules 816 loaded during initialization, and further configured by loading or unloading one or more software modules 816 during operation.

In the illustrated example, the processing circuit 802 may be implemented with a bus architecture, represented generally by the bus 810. The bus 810 may include any number of interconnecting buses and bridges depending on the specific application of the processing circuit 802 and the overall design constraints. The bus 810 links together various circuits including the one or more processors 804, and storage 806. Storage 806 may include memory devices and mass storage devices, and may be referred to herein as computer-readable media and/or processor-readable media. The storage 806 may include transitory storage media and/or non-transitory storage media.

The bus 810 may also link various other circuits such as timing sources, timers, peripherals, voltage regulators, and power management circuits. A bus interface 808 may provide an interface between the bus 810 and one or more transceivers 812. In one example, a transceiver 812 may be provided to enable the apparatus 800 to communicate with a charging or receiving device in accordance with a standards-defined protocol. Depending upon the nature of the apparatus 800, a user interface 818 (e.g., keypad, display, speaker, microphone, joystick) may also be provided, and may be communicatively coupled to the bus 810 directly or through the bus interface 808.

A processor 804 may be responsible for managing the bus 810 and for general processing that may include the execution of software stored in a computer-readable medium that may include the storage 806. In this respect, the processing circuit 802, including the processor 804, may be used to implement any of the methods, functions and techniques disclosed herein. The storage 806 may be used for storing data that is manipulated by the processor 804 when executing software, and the software may be configured to implement any one of the methods disclosed herein.

One or more processors 804 in the processing circuit 802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 806 or in an external computer-readable medium. The external computer-readable medium and/or storage 806 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 806 may also include, by way of example, a carrier wave, a transmission line, and any other suitable medium for transmitting software and/or instructions that may be accessed and read by a computer. Computer-readable medium and/or the storage 806 may reside in the processing circuit 802, in the processor 804, external to the processing circuit 802, or be distributed across multiple entities including the processing circuit 802. The computer-readable medium and/or storage 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 806 may maintain software maintained and/or organized in loadable code segments, modules, applications, programs, etc., which may be referred to herein as software modules 816. Each of the software modules 816 may include instructions and data that, when installed or loaded on the processing circuit 802 and executed by the one or more processors 804, contribute to a run-time image 814 that controls the operation of the one or more processors 804. When executed, certain instructions may cause the processing circuit 802 to perform functions in accordance with certain methods, algorithms and processes described herein.

Some of the software modules 816 may be loaded during initialization of the processing circuit 802, and these software modules 816 may configure the processing circuit 802 to enable performance of the various functions disclosed herein. For example, some software modules 816 may configure internal devices and/or logic circuits 822 of the processor 804, and may manage access to external devices such as a transceiver 812, the bus interface 808, the user interface 818, timers, mathematical coprocessors, and so on. The software modules 816 may include a control program and/or an operating system that interacts with interrupt handlers and device drivers, and that controls access to various resources provided by the processing circuit 802. The resources may include memory, processing time, access to a transceiver 812, the user interface 818, and so on.

One or more processors 804 of the processing circuit 802 may be multifunctional, whereby some of the software modules 816 are loaded and configured to perform different functions or different instances of the same function. The one or more processors 804 may additionally be adapted to manage background tasks initiated in response to inputs from the user interface 818, the transceiver 812, and device drivers, for example. To support the performance of multiple functions, the one or more processors 804 may be configured to provide a multitasking environment, whereby each of a plurality of functions is implemented as a set of tasks serviced by the one or more processors 804 as needed or desired. In one example, the multitasking environment may be implemented using a timesharing program 820 that passes control of a processor 804 between different tasks, whereby each task returns control of the one or more processors 804 to the timesharing program 820 upon completion of any outstanding operations and/or in response to an input such as an interrupt. When a task has control of the one or more processors 804, the processing circuit is effectively specialized for the purposes addressed by the function associated with the controlling task. The timesharing program 820 may include an operating system, a main loop that transfers control on a round-robin basis, a function that allocates control of the one or more processors 804 in accordance with a prioritization of the functions, and/or an interrupt driven main loop that responds to external events by providing control of the one or more processors 804 to a handling function.

In one implementation, the apparatus 800 may be implemented in a wireless charging device that has a battery charging power source coupled to multiple inductive power transfer circuits, a plurality of charging cells and a controller, which may include the one or more processors 804. The plurality of charging cells may be configured to provide a current to one or more charging coils near a surface of the charging device. At least one coil may be configured to direct an electromagnetic field through a charge transfer area of each charging cell. The apparatus 800 may further include a DMA circuit configured to receive at least one demodulated signal from each inductive power transfer circuit. The at least one demodulated signal may be obtained from a voltage or current waveform in a tank circuit of a corresponding inductive power transfer circuit.

The controller may be configured to capture a bit sequence from each demodulated signal by clocking signal state of the each demodulated signal through the DMA circuit, stream bit sequences received from DMA circuit into a plurality of data streams, and decode one or more messages from the plurality of data streams.

In some implementations, each inductive power transfer circuit has a tank circuit that includes a capacitor and a charging coil. A first demodulated signal may be obtained from a first inductive power transfer circuit by demodulating a voltage waveform in a corresponding first tank circuit. The second demodulated signal may be obtained from the first inductive power transfer circuit by demodulating a current waveform in the first tank circuit. In certain implementations, the controller is further configured to capture a first bitstream that includes bits representing the first demodulated signal by clocking signal state of the first demodulated signal through the DMA circuit, capture a second bitstream that includes bits representing the second demodulated signal by clocking signal state of the second demodulated signal through the DMA circuit, decode the first bitstream and the second bitstream independently to obtain two versions of a first encoded message, and select between the two versions of a first encoded message to provide one of the one or more messages decoded from the plurality of data streams.

The controller may be further configured to capture a combined bitstream by clocking bits representing the combined signal state of first demodulated signal and the second demodulated signal through the DMA circuit, and decode the combined bitstream to provide one of the one or more messages decoded from the plurality of data streams.

In some implementations, the controller is further configured to receive a first demodulated signal at a first input of a GPIO port, and receive a second demodulated signal at a second input of the GPIO port. The first demodulated signal may be obtained from a first inductive power transfer circuit. The second demodulated signal may be obtained from a second inductive power transfer circuit. The first demodulated signal may be obtained from a voltage waveform in a tank circuit of a first inductive power transfer circuit. The second demodulated signal may be obtained from a current waveform in the tank circuit of the first inductive power transfer circuit.

In some implementations, the storage 806 maintains instructions and information where the instructions are configured to cause the one or more processors 804 to demodulate or cause demodulation of a voltage or current waveform in each tank circuit of a plurality of inductive power transfer circuits to obtain at least one demodulated signal from each tank circuit, capture a bit sequence from each demodulated signal by clocking signal state of each demodulated signal through a DMA circuit, stream bit sequences received from the DMA circuit into a plurality of data streams and decode one or more messages from the plurality of data streams. A tank circuit in each inductive power transfer circuit may include a charging coil and a capacitor.

In one example, the processor or controller may demodulate or cause demodulation of a voltage waveform in a first tank circuit to obtain a first demodulated signal. In another example, the processor or controller may demodulate or cause demodulation of a current waveform in the first tank circuit to obtain a first demodulated signal. The processor or controller may capture a first bitstream that includes bits representing the first demodulated signal by clocking signal state of the first demodulated signal through the DMA circuit, capture a second bitstream that includes bits representing the second demodulated signal by clocking signal state of the second demodulated signal through the DMA circuit, decode the first bitstream and the second bitstream independently to obtain two versions of a first encoded message, and select between the two versions of a first encoded message to provide one of the one or more messages decoded from the plurality of data streams. In one example, the processor or controller may capture a combined bitstream by clocking bits representing the combined signal state of first demodulated signal and the second demodulated signal through the DMA circuit, decode the combined bitstream to provide one of the one or more messages decoded from the plurality of data streams.

In certain implementations, capturing the bit sequence from each demodulated signal includes receiving a first demodulated signal at a first input of a GPIO port, and receiving a second demodulated signal at a second input of the GPIO port. The first demodulated signal may be obtained from a first inductive power transfer circuit. The second demodulated signal may be obtained from a second inductive power transfer circuit. The first demodulated signal may be obtained from a voltage waveform in a tank circuit of a first inductive power transfer circuit. The second demodulated signal may be obtained from a current waveform in the tank circuit of the first inductive power transfer circuit.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for decoding data, comprising:
   demodulating a voltage or current waveform in each tank circuit of a plurality of inductive power transfer circuits to obtain at least one demodulated signal from each tank circuit;
   capturing a bit sequence from each demodulated signal by clocking signal state of each demodulated signal through a direct memory access (DMA) circuit;
   streaming bit sequences received from the DMA circuit into a plurality of data streams; and decoding one or more messages from the plurality of data streams.

2. The method of claim 1, further comprising:
demodulating a voltage waveform in a first tank circuit to obtain a first demodulated signal; and
demodulating a current waveform in the first tank circuit to obtain a second demodulated signal.

3. The method of claim 2, further comprising:
capturing a first bitstream that includes bits representing the first demodulated signal by clocking signal state of the first demodulated signal through the DMA circuit;
capturing a second bitstream that includes bits representing the second demodulated signal by clocking signal state of the second demodulated signal through the DMA circuit;
decoding the first bitstream and the second bitstream independently to obtain two versions of a first encoded message; and
selecting between the two versions of a first encoded message to provide one of the one or more messages decoded from the plurality of data streams.

4. The method of claim 2, further comprising:
capturing a combined bitstream by clocking bits representing a combined signal state of the first demodulated signal and the second demodulated signal through the DMA circuit; and
decoding the combined bitstream to provide one of the one or more messages decoded from the plurality of data streams.

5. The method of claim 1, wherein capturing the bit sequence from each demodulated signal comprises:
receiving a first demodulated signal at a first input of a general-purpose input/output (GPIO) port; and
receiving a second demodulated signal at a second input of the GPIO port.

6. The method of claim 5, wherein the first demodulated signal is obtained from a first inductive power transfer circuit, and wherein the second demodulated signal is obtained from a second inductive power transfer circuit.

7. The method of claim 5, wherein the first demodulated signal is obtained from a voltage waveform in a tank circuit of a first inductive power transfer circuit, and wherein the second demodulated signal is obtained from a current waveform in the tank circuit of the first inductive power transfer circuit.

8. The method of claim 5, wherein the tank circuit of each inductive power transfer circuit comprises a charging coil and a capacitor.

9. A charging device, comprising:
a charging circuit that includes a plurality of inductive power transfer circuits, each inductive power transfer circuits having a charging coil located proximate to a surface of the charging device;
a direct memory access (DMA) circuit configured to receive at least one demodulated signal from each inductive power transfer circuit, wherein the at least one demodulated signal is obtained from a voltage or current waveform in a tank circuit of a corresponding inductive power transfer circuit; and
a controller configured to:
capture a bit sequence from each demodulated signal by clocking signal state of the each demodulated signal through the DMA circuit;
stream bit sequences received from the DMA circuit into a plurality of data streams; and
decode one or more messages from the plurality of data streams.

10. The charging device of claim 9, wherein each inductive power transfer circuit comprises:
a tank circuit that includes a capacitor and a charging coil, wherein a first demodulated signal is obtained from a first inductive power transfer circuit by demodulating a voltage waveform in a corresponding first tank circuit, and wherein a second demodulated signal is obtained from the first inductive power transfer circuit by demodulating a current waveform in the first tank circuit.

11. The charging device of claim 10, wherein the controller is further configured to:
capture a first bitstream that includes bits representing the first demodulated signal by clocking signal state of the first demodulated signal through the DMA circuit;
capture a second bitstream that includes bits representing the second demodulated signal by clocking signal state of the second demodulated signal through the DMA circuit;
decode the first bitstream and the second bitstream independently to obtain two versions of a first encoded message; and
select between the two versions of a first encoded message to provide one of the one or more messages decoded from the plurality of data streams.

12. The charging device of claim 10, wherein the controller is further configured to:
capture a combined bitstream by clocking bits representing combined signal state of the first demodulated signal and the second demodulated signal through the DMA circuit; and
decode the combined bitstream to provide one of the one or more messages decoded from the plurality of data streams.

13. The charging device of claim 9, wherein the controller is further configured to:
receive a first demodulated signal at a first input of a general-purpose input/output (GPIO) port; and
receiving a second demodulated signal at a second input of the GPIO port.

14. The charging device of claim 13, wherein the first demodulated signal is obtained from a first inductive power transfer circuit, and wherein the second demodulated signal is obtained from a second inductive power transfer circuit.

15. The charging device of claim 13, wherein the first demodulated signal is obtained from a voltage waveform in a tank circuit of a first inductive power transfer circuit, and wherein the second demodulated signal is obtained from a current waveform in the tank circuit of the first inductive power transfer circuit.

16. A non-transitory processor-readable storage medium comprising code for:
demodulating a voltage or current waveform in each tank circuit of a plurality of inductive power transfer circuits to obtain at least one demodulated signal from each tank circuit;
capturing a bit sequence from each demodulated signal by clocking signal state of each demodulated signal through a direct memory access (DMA) circuit;
streaming bit sequences received from the DMA circuit into a plurality of data streams; and
decoding one or more messages from the plurality of data streams.

17. A non-transitory processor-readable storage medium of claim 16, further comprising code for:
demodulating a voltage waveform in a first tank circuit to obtain a first demodulated signal; and demodulating a current waveform in the first tank circuit to obtain a second demodulated signal.

18. A non-transitory processor-readable storage medium of claim 17, further comprising code for:
capturing a first bitstream that includes bits representing the first demodulated signal by clocking signal state of the first demodulated signal through the DMA circuit;
capturing a second bitstream that includes bits representing the second demodulated signal by clocking signal state of the second demodulated signal through the DMA circuit;
decoding the first bitstream and the second bitstream independently to obtain two versions of a first encoded message; and
selecting between the two versions of a first encoded message to provide one of the one or more messages decoded from the plurality of data streams.

19. A non-transitory processor-readable storage medium of claim 17, further comprising code for:
capturing a combined bitstream by clocking bits representing combined signal state of the first demodulated signal and the second demodulated signal through the DMA circuit; and
decoding the combined bitstream to provide one of the one or more messages decoded from the plurality of data streams.

20. A non-transitory processor-readable storage medium of claim 16, further comprising code for:
receiving a first demodulated signal at a first input of a general-purpose input/output (GPIO) port; and
receiving a second demodulated signal at a second input of the GPIO port,
wherein the first demodulated signal is obtained from a first inductive power transfer circuit, and wherein the second demodulated signal is obtained from a second inductive power transfer circuit.

* * * * *